(12) United States Patent
Yeo et al.

(10) Patent No.: US 11,207,992 B2
(45) Date of Patent: Dec. 28, 2021

(54) POWER CONVERSION SYSTEM FOR VEHICLES AND CONTROL METHOD THEREOF

(71) Applicants: Hyundai Motor Company, Seoul (KR); Kia Motors Corporation, Seoul (KR)

(72) Inventors: In Yong Yeo, Gyeonggi-do (KR); Jin Myeong Yang, Gyeonggi-do (KR); Woo Young Lee, Gyeonggi-do (KR); Youn Sik Lee, Gyeonggi-do (KR); Dae Woo Lee, Incheon (KR); Jong Pil Kim, Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 406 days.

(21) Appl. No.: 16/121,056

(22) Filed: Sep. 4, 2018

(65) Prior Publication Data
US 2019/0315233 A1 Oct. 17, 2019

(30) Foreign Application Priority Data
Apr. 17, 2018 (KR) .................. 10-2018-0044634

(51) Int. Cl.
*B60L 53/20* (2019.01)
*B60L 50/60* (2019.01)
(52) U.S. Cl.
CPC .............. *B60L 53/20* (2019.02); *B60L 50/66* (2019.02); *B60L 2210/22* (2013.01); *B60L 2210/30* (2013.01)
(58) Field of Classification Search
CPC ........ H02J 7/342; H02J 7/1423; H02J 7/0027; B60L 2210/30; B60L 2210/22
(Continued)

(56) References Cited

U.S. PATENT DOCUMENTS 5,633,577 A * 5/1997 Matsumae ........ H02M 3/33569
322/37
2012/0212174 A1* 8/2012 Ishikawa ............... H01M 10/46
320/103

(Continued)

FOREIGN PATENT DOCUMENTS

KR 2013-0117210 A 10/2013
KR 10-1489226 B1 2/2015
(Continued)

*Primary Examiner* — Rexford N Barnie
*Assistant Examiner* — Terrence R Willoughby
(74) *Attorney, Agent, or Firm* — Mintz Levin Cohn Ferris Glovsky and Popeo, P.C.; Peter F. Corless (57) ABSTRACT

A power conversion system for vehicles is provided. The system includes a switching circuit having first input/output terminals, second input/output terminals and a plurality of switching elements connected between the first input/output terminals and the second input/output terminals. A first energy storage device is connected to the second input/output terminals and has a preset charging/discharging voltage. A first voltage conversion circuit converts power output from the first input/output terminals to output a voltage less than the voltage of the first energy storage device. A second energy storage device is charged/discharged with the output voltage of the first voltage conversion circuit. A controller controls open/short-circuit states of the switching elements based on whether the first energy storage device is being charged and whether the vehicle is traveling. When the first energy storage device is being charged, AC charging power is provided to the first input/output terminals from outside of the vehicle.

11 Claims, 5 Drawing Sheets

(58) Field of Classification Search
USPC .......................... 307/9.1–10.8; 320/103–104
See application file for complete search history.

(56) References Cited

U.S. PATENT DOCUMENTS

| | | | |
|---|---|---|---|
| 2013/0020983 A1* | 1/2013 | Ishikawa | H02J 5/00 |
| | | | 320/104 |
| 2016/0297309 A1* | 10/2016 | Kim | B60L 11/1811 |
| 2017/0358987 A1* | 12/2017 | Oouchi | B60L 53/14 |
| 2019/0061553 A1* | 2/2019 | Yang | B60L 58/20 |
| 2019/0176652 A1* | 6/2019 | Teng | H02J 7/007184 |
| 2019/0305393 A1* | 10/2019 | Oguma | B60L 53/11 |
| 2019/0312499 A1* | 10/2019 | Ha | B60L 53/22 |

FOREIGN PATENT DOCUMENTS

| | | |
|---|---|---|
| KR | 10-1558794 B1 | 10/2015 |
| KR | 2017-0131895 A | 12/2017 |

* cited by examiner

POWER CONVERSION SYSTEM FOR VEHICLES AND CONTROL METHOD THEREOF

CROSS REFERENCE TO RELATED APPLICATION

The present application claims priority to Korean Patent Application No. 10-2018-0044634, filed Apr. 17, 2018, the entire contents of which is incorporated herein for all purposes by this reference.

BACKGROUND

1. Field of the Invention

The present invention relates to a power conversion system for vehicles and a control method thereof, and more particularly, to a power conversion system which improves space utilization by decreasing the size of the power conversion system.

2. Description of the Related Art

In general, battery charging methods of environmentally friendly vehicles may be divided into a slow charging method and a quick charging method. Specifically, the slow charging method refers to a method of applying an external alternating current (AC) voltage for home use or general buildings to an on-board charger (OBC) mounted within a vehicle through a charging stand (e.g., external charger) or the like to rectify the AC voltage into a direct current (DC) voltage, boosting the DC voltage to a DC voltage suitable for charging and then charging a high voltage battery with the DC voltage. The quick charging method refers to a method of outputting high current to perform charging within a shorter period of time than the time required for slow charging. Since the quick charging method requires more than ten times the rated power of slow charging, a quicker charger is unable to be mounted within a vehicle and thus, a dedicated quick charger is required to be installed separately.

Meanwhile, an on-board charger for rectifying an external AC voltage into a DC voltage, as described above, is required to be mounted in environmentally friendly vehicles chargeable through the slow charging method. To improve availability of a limited space within a vehicle, research is being actively conducted regarding reducing the sizes of power elements and devices mounted within a vehicle including the on-board charger.

SUMMARY

The present invention provides a power conversion system for vehicles and a control method thereof which improves space utilization and reduces costs by decreasing the size of the power conversion system by using a plurality of switching elements in a switching circuit and a first voltage circuit.

To accomplish the object, a power conversion system for vehicles according to the present invention may include: a switching circuit having first input/output terminals, second input/output terminals and a plurality of switching elements connected between the first input/output terminals and the second input/output terminals; a first energy storage device connected to the second input/output terminals and having a preset charging/discharging voltage; a first voltage conversion circuit for converting power output from the first input/output terminals to output a voltage less than the voltage of the first energy storage device; a second energy storage device charged/discharged to the output voltage of the first voltage conversion circuit; and a controller configured to operate open/short-circuit states of the plurality of switching elements based on whether the first energy storage device is being charged and whether the vehicle is traveling. Additionally, AC charging power for charging the first energy storage device may be provided to the first input/output terminals from outside of the vehicle when the first energy storage device is being charged.

The power conversion system for vehicles may further include a switching unit configured to determine an electrical connection state between the first input/output terminals and the first voltage conversion circuit. The controller may be configured to open the switching unit and operate the plurality of switching elements to convert the AC charging power provided to the first input/output terminals to thus output the charging/discharging voltage of the first energy storage device through the second input/output terminals when the first energy device is being charged.

The controller may be configured to short-circuit the switching unit and operate the plurality of switching elements to convert the power of the first energy storage device provided to the second input/output terminals into AC power to be output through the first input/output terminals when the vehicle is traveling. The first voltage conversion circuit may be configured to convert AC power of the first energy storage device provided from the first input/output terminals to output a DC voltage less than the voltage of the first energy storage device.

The switching circuit may be a full-bridge circuit including the plurality of switching elements. The first voltage conversion circuit may include: a transformer configured to change the level of an AC power provided from the first input/output terminals; and a rectifier configured to rectify an AC voltage output from the transformer to output a DC voltage. The power conversion system for vehicles may further include a second voltage conversion circuit configured to receive a DC voltage of the first energy storage device and convert the DC voltage into a power supply voltage of an electrical load of the vehicle. The controller may then be configured to drive the second voltage conversion circuit when the first energy storage device is being charged.

To accomplish the object, a method of controlling a power conversion system for vehicles according to the present invention may include: determining whether a first energy storage device within a vehicle is being charged and whether the vehicle is traveling; opening a switching unit and operating a plurality of switching elements to convert AC charging power provided to first input/output terminals to output a charging/discharging voltage of the first energy storage device through second input/output terminals upon determining that the first energy device is being charged; and short-circuiting the switching unit and operating the plurality of switching elements to convert power of the first energy storage device provided to the second input/output terminals into AC power to be output through the first input/output terminals upon determining that the vehicle is traveling. The method may further include driving second voltage conversion circuit upon determining that the first energy storage device is being charged.

According to the present invention, it may be possible to decrease the size of the power conversion system by using the plurality of switching elements in the switching circuit and the first voltage circuit, thereby improving space utilization and reducing costs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a power conversion system for vehicles and a control method thereof according to exemplary embodiments of the present invention will be described with reference to the attached drawings.

Figure 1:
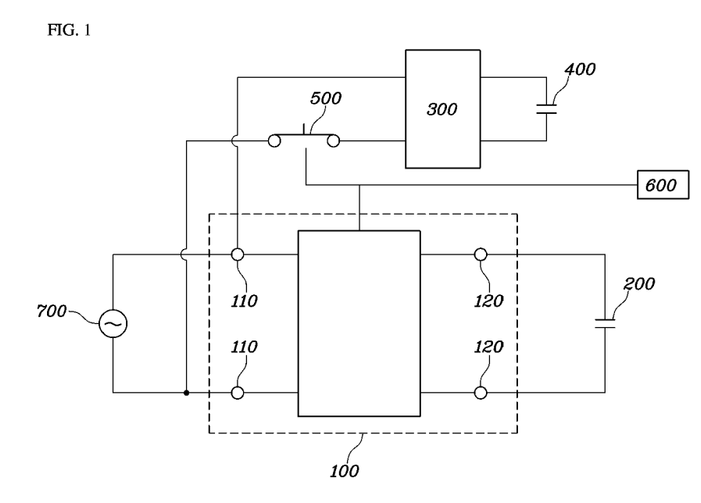
FIG. 1 is a schematic diagram showing a configuration of a power conversion system for vehicles according to an exemplary embodiment of the present invention.
Figure 2:
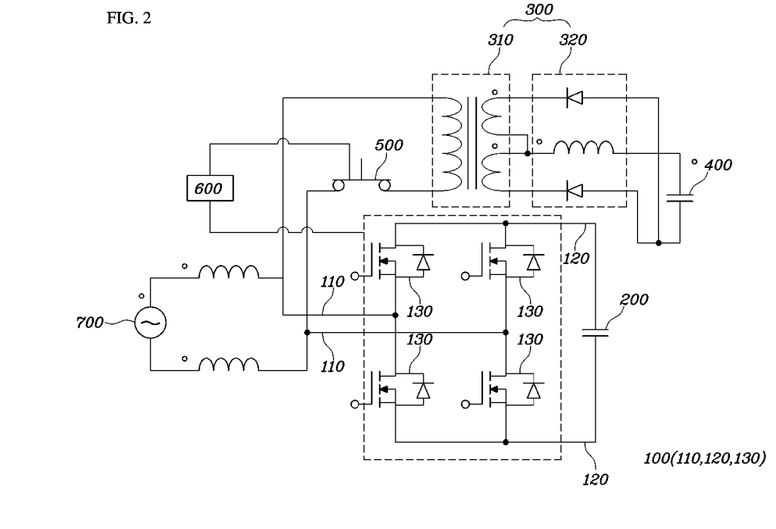
FIG. 2 is a detailed diagram showing the power conversion system for vehicles according to an exemplary embodiment of the present invention.
Figure 3:
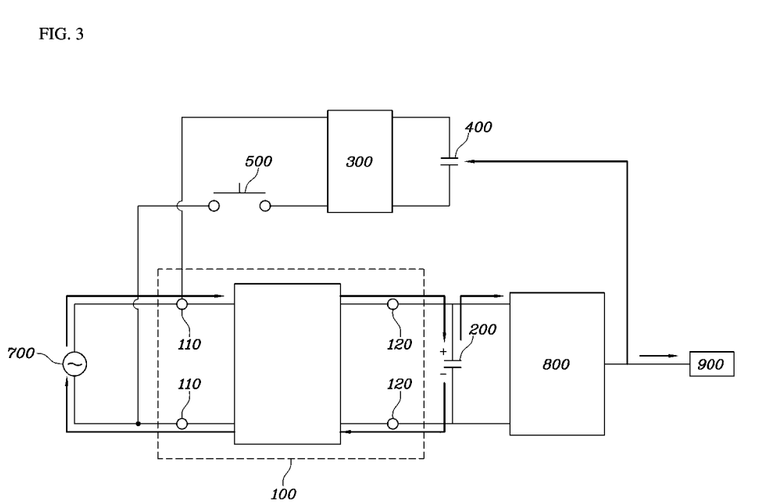
FIG. 3 is a diagram showing a flow of power provided from outside when a first energy storage device is charged in the power conversion system for vehicles according to an exemplary embodiment of the present invention.
Figure 4:
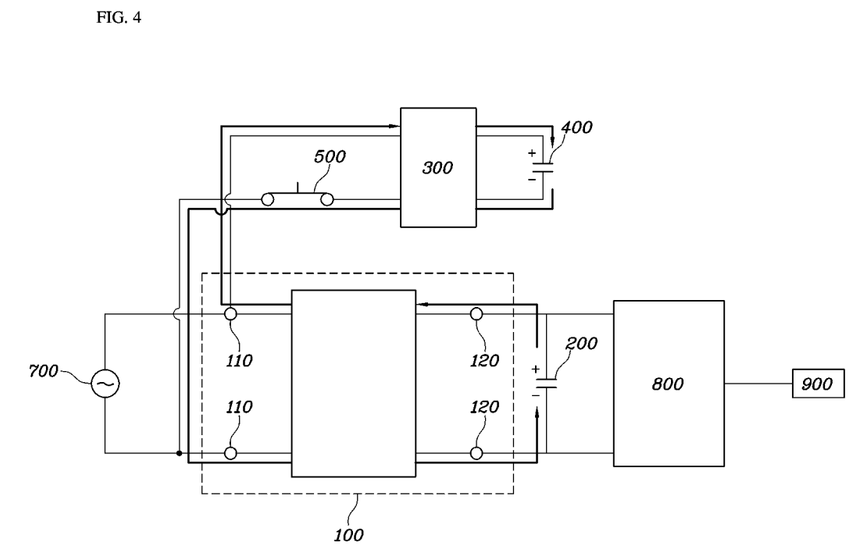
FIG. 4 is a diagram showing a flow of power provided from the first energy storage device when a vehicle is traveling in the power conversion system for vehicles according to an exemplary embodiment of the present invention.

FIG. 1 is a schematic diagram showing a configuration of the power conversion system for vehicles according to an exemplary embodiment of the present invention and FIG. 2 is a detailed diagram showing the power conversion system for vehicles. FIG. 3 is a diagram showing a flow of power provided from outside when a first energy storage device is being charged and FIG. 4 is a diagram showing a flow of power provided from the first energy storage device when a vehicle is traveling.

Referring to FIGS. 1 to 4, the power conversion system mounted within a vehicle according to the present invention may include a switching circuit 100, a first energy storage device 200, a first voltage conversion circuit 300, a second energy storage device 400, a controller 600 and a power supply 700. The power conversion system may further include a switching unit 500 and a second voltage conversion circuit 800 according to an exemplary embodiment. A detailed configuration of the power conversion system according to the present invention will be described in detail below.

The switching circuit 100 may include first input/output terminals 110, second input/output terminals 120, and a plurality of switching elements 130 connected between the first input/output terminals 110 and the second input/output terminals 120. In particular, the plurality of switching elements 130 connected between the first input/output terminals 110 and the second input/output terminals 120 may be connected in a full-bridge circuit structure and may be configured to convert alternating current (AC) power into direct current (DC) power or convert DC power into AC power.

Specifically, the switching circuit 100 may be configured to convert external AC charging power from the outside (e.g., from an external charger) through the first input/output terminals 110 from the power supply 700 into DC power and transfer the DC power to the first energy storage device 200 connected to the second input/output terminals 120 such that the first energy storage device 200 having a preset charging/discharging voltage may be charged with the DC power. In addition, the switching circuit 100 may be configured to convert DC power input from the first energy storage device 200 through the second input/output terminals 120 into AC power and output the AC power to the first input/output terminals 110.

In other words, the switching circuit 100 according to the present invention may be configured to convert the AC charging power input from outside through the power supply 700 into DC power and transfer the DC power to the first energy storage device 200 when the first energy storage device 200 is being charged and may be configured to convert DC power input from the first energy storage device 200 into AC power and transfer the AC power to the second energy storage device 400 through the first voltage conversion circuit 300 when the vehicle is traveling.

The first energy storage device 200 may be connected to the second input/output terminals 120 and may be an energy storage device having a preset charging/discharging voltage. The first energy storage device 200 may be a high voltage battery configured to store and provide electric energy for driving a motor of a vehicle according to an exemplary embodiment. However, the high voltage battery is merely an example and various devices capable of storing and providing electric energy for driving a motor of a vehicle including a super capacitor may be used as the first energy storage device of the present invention.

The first voltage conversion circuit 300 may be configured to convert power output from the first input/output terminals 110 into a voltage less than the voltage of the first energy storage device 200 and transfer the voltage to the second energy storage device 400. Specifically, the first voltage conversion circuit 300 may be configured to convert AC power converted from DC power of the first energy storage device 200 and provided thereto through the first input/output terminals 110 into a DC voltage less than the voltage of the first energy storage device 200 and output the DC voltage.

The first voltage conversion circuit 300 may include a transformer 310 configured to change or adjust the level of an AC voltage provided from the first input/output terminals 110 and a rectifier 320 configured to rectify the AC voltage output from the transformer 310 to output a DC voltage. In other words, the first voltage conversion circuit 300 may be configured to change the level of the AC power converted from the DC power of the first energy storage device 200, which is input thereto through the first input/output terminals 110, through the transformer 310, rectify the AC voltage output from the transformer 310 into a DC voltage through the rectifier 320 and transfer the DC voltage to the second energy storage device 400.

The second energy storage device 400 may be an energy storage device connected to the output terminal of the first voltage conversion circuit 300 and charged/discharged with/to the output voltage of the first voltage conversion circuit 300. The second energy storage device 400 may be a battery configured to store and provide electric energy for driving an electrical load 900, a switched-mode power supply (SMPS) and the like of the vehicle. However, this is merely exemplary and various devices capable of storing and providing electric energy for driving the electrical load 900, the SMPS and the like may be used as the second energy storage device 400 of the present invention.

The switching unit 500 may be configured to determine an electrical connection state between the first input/output terminals 110 and the first voltage conversion circuit 300 and a relay may be used as the switching unit 500 according to an exemplary embodiment. More specifically, the switching unit 500 may be open or short-circuited by the controller 600 as described herein, and thus the first input/output terminals 110 and the first voltage conversion circuit 300 may be electrically open or short-circuited.

Particularly, the controller 600 may be configured to control open/short-circuit states of the plurality of switching elements 130 in the switching circuit 100 and open/short-circuit states of the switching unit 500 based on whether the first energy storage device 200 is being charged and whether the vehicle is traveling (e.g., being driven). When the first energy storage device 200 is being charged, AC power for charging the first energy storage device 200 may be provided to the first input/output terminals 110 from the outside of the vehicle through the power supply 700, as shown in FIG. 3. More specifically, the controller 600 may be configured to open the switching unit 500 and operate the switching elements 130 in the switching circuit 100 to convert the AC power provided to the first input/output terminals such that the second input/output terminals 120 outputs a charging/discharging voltage of the first energy storage device 200 when the first energy storage device 200 is being charged.

In addition, the controller 600 may be configured to operate the second voltage conversion circuit 800 when the first energy storage device 200 is charged. Particularly, the second voltage conversion circuit 800 may be a circuit which is provided with the DC voltage of the first energy storage device 200, may be configured to convert the DC voltage into a power supply voltage for the electrical load 900 and the SMPS of the vehicle and provide the power supply voltage to the electrical load 900 and the SMPS of the vehicle. In other words, the controller 600 may be configured to drive or operate the second voltage conversion circuit 800 to convert the DC voltage provided from the first energy storage device 200 and supply the converted voltage to the electrical load 900 and the like of the vehicle when the first energy storage device 200 is being charged.

When the vehicle is being driven, the controller 600 may be configured to short-circuit the switching unit 500 (e.g., a switch) and operate the plurality of switching elements 130 to convert the power of the first energy storage device 200 provided to the first input/output terminals 120 and output the power as AC power from the first input/output terminals 110. In other words, the controller 600 may be configured to operate the plurality of switching elements 130 to convert the DC power of the first energy storage device 2100 input to the switching circuit 100 through the second input/output terminals 120 into AC power to be output through the first input/output terminals 110 and short-circuit the switching unit 500 to input the AC power output from the first input/output terminals 110 to the first voltage conversion circuit 300 and then provide the AC power to the second energy storage device 400 when the vehicle is being driven.

As described above, the switching circuit and the first voltage circuit may use the plurality of switching elements in the power conversion system for vehicles. Accordingly, the size of the power conversion system may be reduced to improve space utilization and decrease overall costs.

Figure 5:
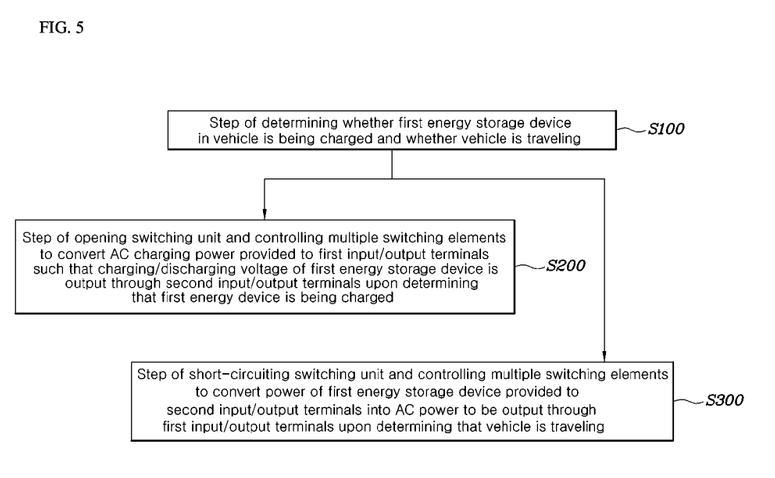
FIG. 5 is a flowchart of a method of controlling the power conversion system for vehicles according to an exemplary embodiment of the present invention.

FIG. 5 is a flowchart of a method of controlling the power conversion system for vehicles according to an exemplary embodiment of the present invention. The method described herein below may be executed by the controller having a processor and a memory. As shown in FIG. 5, the method of controlling the power conversion system for vehicles according to an exemplary embodiment of the present invention may include determining whether the first energy storage device in a vehicle is being charged and whether the vehicle is being driven, opening the switching unit and operating the plurality of switching elements to convert AC charging power provided to the first input/output terminals to thus output a charging/discharging voltage of the first energy storage device 200 through the second input/output terminals upon determining that the first energy device is being charged, and short-circuiting the switching unit and operating the plurality of switching elements to convert the power of the first energy storage device provided to the second input/output terminals into AC power to be output through the first input/output terminals upon determining that the vehicle is being driven. In addition, the method may include driving or operating the second voltage conversion circuit upon determining that the first energy storage device is being charged.

Technical features with respect to the steps of the method of controlling the power conversion system for vehicles according to the present invention are the same as the above-described features of the power conversion system for vehicles, and thus detailed description thereof is omitted.

What is claimed is:

1. A power conversion system for vehicles included in a vehicle, comprising:
    a switching circuit including first input/output terminals, second input/output terminals, and a plurality of switching elements connected between the first input/output terminals and the second input/output terminals, wherein the switching circuit is a bi-directional alternating current/direct current (AC/DC) converter;
    a first energy storage device connected to the second input/output terminals and having a preset charging/discharging voltage;
    a first voltage conversion circuit for converting power output from the first input/output terminals to output a voltage less than the voltage of the first energy storage device;
    a second energy storage device charged/discharged with the output voltage of the first voltage conversion circuit; and
    a controller configured to control open/short-circuit states of the plurality of switching elements based on whether the first energy storage device is being charged and whether the vehicle is being driven,
    wherein when the first energy storage device is being charged, then alternating current (AC) charging power for charging the first energy storage device is provided to the first input/output terminals from outside of the vehicle, and
    wherein the first input/output terminals are connected to a charging port to receive the AC charging power from the outside.

2. The power conversion system for vehicles according to claim 1, further comprising:
    a switching unit configured to determine an electrical connection state between the first input/output terminals and the first voltage conversion circuit.

3. The power conversion system for vehicles according to claim 2, wherein the controller is configured to open the switching unit and operate the plurality of switching elements to convert the AC charging power provided to the first input/output terminals to output the charging/discharging voltage of the first energy storage device through the second input/output terminals when the first energy device is being charged.

4. The power conversion system for vehicles according to claim 2, wherein the controller is configured to short-circuit the switching unit and control the plurality of switching elements to convert the power of the first energy storage device provided to the second input/output terminals into AC power to be output through the first input/output terminals when the vehicle is being driven.

5. The power conversion system for vehicles according to claim 4, wherein the first voltage conversion circuit is configured to convert the AC power of the first energy storage device provided from the first input/output terminals to output a direct current (DC) voltage less than the voltage of the first energy storage device.

6. The power conversion system for vehicles according to claim 1, wherein the switching circuit is a full-bridge circuit including the plurality of switching elements.

7. The power conversion system for vehicles according to claim 1, wherein the first voltage conversion circuit includes:
    a transformer configured to change the level of AC power provided from the first input/output terminals; and
    a rectifier configured to rectify an AC voltage output from the transformer to output a direct current (DC) voltage.

8. The power conversion system for vehicles according to claim 1, further comprising:
    a second voltage conversion circuit configured to receive a direct current (DC) voltage of the first energy storage device and convert the DC voltage into a power supply voltage of an electrical load of the vehicle.

9. The power conversion system for vehicles according to claim 8, wherein the controller is configured to operate the second voltage conversion circuit when the first energy storage device is being charged.

10. A method of controlling a power conversion system of claim 1, comprising:
    determining, by a controller, whether the first energy storage device within the vehicle is being charged and whether the vehicle being driven;
    opening, by the controller, a switching unit which is configured to determine an electrical connection state between the first input/output terminals and the first voltage conversion circuit and operating the plurality of switching elements to convert alternating current (AC) charging power provided to the first input/output terminals to output a charging/discharging voltage of the first energy storage device through the second input/output terminals in response to determining that the first energy device is being charged; and
    short-circuiting, by the controller, the switching unit and operating the plurality of switching elements to convert power of the first energy storage device provided to the second input/output terminals into AC power to be output through the first input/output terminals in response to determining that the vehicle is being driven.

11. The method of controlling a power conversion system for vehicles according to claim 10, further comprising:
    operating, by the controller, a second voltage conversion circuit, which is configured to receive a direct current (DC) voltage of the first energy storage device and convert the DC voltage into a power supply voltage of an electrical load of the vehicle in response to determining that the first energy storage device is being charged.

* * * * *